United States Patent [19]

Kubo et al.

[11] 4,426,891

[45] Jan. 24, 1984

[54] RADIALLY OUTWARD RETURN SPRING FOR TRANSMISSION BRAKE

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Toyota, Japan

[21] Appl. No.: 202,122

[22] Filed: Oct. 30, 1980

[30] Foreign Application Priority Data

Mar. 21, 1980 [JP] Japan .................. 55-36644

[51] Int. Cl.³ .............................................. F16H 37/00
[52] U.S. Cl. .................................... 74/740; 192/70.28
[58] Field of Search ...................... 74/740; 192/70.28

[56] References Cited

U.S. PATENT DOCUMENTS

| | | | |
|---|---|---|---|
| 2,254,335 | 9/1941 | Vincent | 74/740 |
| 2,593,629 | 4/1952 | Swift | 74/740 |
| 2,690,086 | 9/1954 | Cook | 74/740 |
| 2,869,400 | 1/1959 | Langdon | 74/740 |
| 3,533,307 | 10/1970 | Gunderson | 74/740 |
| 3,537,556 | 11/1970 | Pfeffer | 192/70.28 |
| 3,877,321 | 4/1975 | Storer, Jr. | 192/70.28 |
| 3,916,729 | 11/1975 | Herr | 74/740 |
| 3,939,733 | 2/1976 | Wetrich | 74/740 |

FOREIGN PATENT DOCUMENTS

| | | | |
|---|---|---|---|
| 55-103147 | 7/1980 | Japan | 74/740 |
| 964968 | 7/1964 | United Kingdom | 74/740 |

Primary Examiner—Leslie A. Braun
Assistant Examiner—D. Wright
Attorney, Agent, or Firm—Stevens, Davis, Miller & Mosher

[57] ABSTRACT

A transmission has a gear mechanism which is selected between speeds by selective engagement of a brake including first and second friction plate elements. A piston is driven by pressure in a fluid pressure chamber so as selectively to squeeze the friction plate elements together and engage them. A return spring for releasing this engagement is mounted parallel to the axis of rotation of the brake in a cavity formed in the transmission housing, radially outside the brake, and biases the piston in the release direction. This allows the transmission to be axially shorter than when the return spring is mounted radially inwards of the brake.

2 Claims, 4 Drawing Figures

RADIALLY OUTWARD RETURN SPRING FOR TRANSMISSION BRAKE

BACKGROUND OF THE INVENTION

The present invention relates to a transmission for a vehicle such as an automobile, and more particularly relates to an improvement in an automatic transmission for the purpose of reducing its axial length.

A conventional automatic transmission for a vehicle commonly includes a gear transmission mechanism which is selected between various speed stages by selective engagement of various friction engaging devices, including clutches and brakes. Such friction engaging devices generally include a plurality of plate shaped friction engaging elements, which are parallel to one another and mutually oppose one another. One set of these friction plate elements rotates about its axis of symmetry relative to the other set of these friction plate elements, and a hydraulic piston device is arranged so that when it is supplied with hydraulic pressure it squeezes together axially the first and second sets of friction plate elements, thus engaging them together and preventing relative rotation between them. Thus, according to selective engagement of such friction engaging devices, various speed stages are selected for the transmission. These friction engaging devices can either be clutches, which are defined as selectively engagable devices which couple together two rotating members which may be rotating at different speeds, or brakes, which may be defined as selectively engagable devices which couple a rotating member to a fixed member such as the transmission housing.

Conventional return devices for such hydraulic piston devices have included a spring which biases the piston in the direction to reduce the size of the pressure chamber which actuates it. Conventionally and commonly, the piston of the hydraulic piston device has been formed with a hollow facing in the direction in which it is impelled by the pressure chamber, and the spring has been disposed within this hollow space, with its one end bearing against the piston and its other end bearing against a member which does not move axially, so that the spring opposes the motion of the piston.

Nowadays an increasing number of vehicles such as automobiles are being constructed in the front engine front wheel drive configuration. In such a construction, which typically uses a transverse engine, the axis of an automatic transmission generally runs parallel to the front axle of the vehicle. Accordingly, it becomes very important to reduce the axial dimension of the transmission as a whole as much as possible. This becomes particularly important when the automatic transmission is coupled with a subtransmission.

For reducing the total axial dimension of the automatic transmission, it is very desirable for components of the transmission to be overlapped axially as much as possible, and particularly it is very desirable that components of the friction engaging devices in the transmission should be arranged to overlap axially with parts of the gear transmission mechanisms in the automatic transmission, such as the gear wheels and planetary mechanisms. Such overlapping, however, means that the maximum possible radial extent of the hydraulic piston devices becomes greatly reduced. Accordingly, the above outlined construction for housing the return spring for the hydraulic piston device within a hollow chamber facing axially along the direction of motion of the piston becomes impracticable, because there is not enough radial space available on the piston for such a construction.

SUMMARY OF THE INVENTION

The present invention addresses problems such as the above described ones which occur when it is desired to reduce as much as possible the axial dimension of an automatic transmission, and particularly addresses itself to the question of arranging the construction of a brake so as to maximize the interior space therein available for overlapping accommodation of elements of the transmission such as gears.

Therefore, it is an object of the present invention to provide an improved construction for releasing the engagement of the friction plate elements of a brake, which by eliminating the above described problems allows the total axial length of the transmission to be substantially reduced.

It is a further object of the present invention to provide such a construction for releasing engagement of the friction plate elements of a brake, which is cheap, simple, and easy to manufacture, and which is nevertheless reliable during use and easy to service.

It is a yet further object of the present invention to provide such a construction for releasing engagement of the friction plate elements of a brake, in which the provision of a return spring as located within a housing of the transmission ensures that said spring is less subject to deterioration through overheating.

According to the present invention, these and other objects are accomplished by, in a transmission comprising: a housing; a gear transmission mechanism received within said housing; a first friction plate element mounted so as to be rotatable about an axis, and connected to part of said gear transmission mechanism, and a second friction plate element axially opposed to said first friction plate element and rotationally coupled to said housing, selective mutual engagement and disengagement of said first and second friction plate elements selectively providing different speed stages of said transmission; and a fluid pressure chamber and a piston fitted in said fluid pressure chamber; supply of fluid pressure to said fluid pressure chamber impelling said piston so as to squeeze said first and second friction plate elements together in the direction along said axis and so as to cause said engagement: a construction for releasing said engagement, comprising a spring, mounted parallel to said axis within a cavity formed in said housing, radially external with respect to said axis from said first and second friction plate elements, which biases said piston in the direction to reduce the size of said fluid pressure chamber.

According to such a construction, wherein the return spring for the piston of the friction engaging device is mounted within the housing of the automatic transmission, radially outside of the friction plate elements, much more space may be made available radially inwards of the piston and the fluid pressure chamber of the hydraulic piston engaging device, thereby making it possible to overlap other elements of the transmission such as gears and the like with this hydraulic piston device. Further, by the return spring being mounted within the housing of the transmission, its vulnerability to heat generated by friction in the brake is diminished, and accordingly its service life may be expected to be substantially greater.

BRIEF DESCRIPTION OF THE DRAWINGS

The present invention will become more fully understood from the following description of several preferred embodiment thereof, which is to be taken in conjunction with the accompanying drawings. It should be clearly understood, however, that the description of the embodiment, and the drawings, are all of them provided purely for the purposes of illustration and exemplification only, and are in no way to be taken as limitative of the scope of the present invention. In the drawings:

FIG. 3 is a sectional diagram, taken along the line III—III in FIG. 2, and showing only the radially outer portions of this section, illustrating the construction of the transmission housing and of friction plate elements rotationally coupled thereto, and of springs located within holes in the housing and extending along the axis of the transmission; and FIG. 4 is a plan view of a ring element which is comprised in the construction according to the present invention shown in FIGS. 2 and 3.

DESCRIPTION OF THE PREFERRED EMBODIMENT

Figure 1:
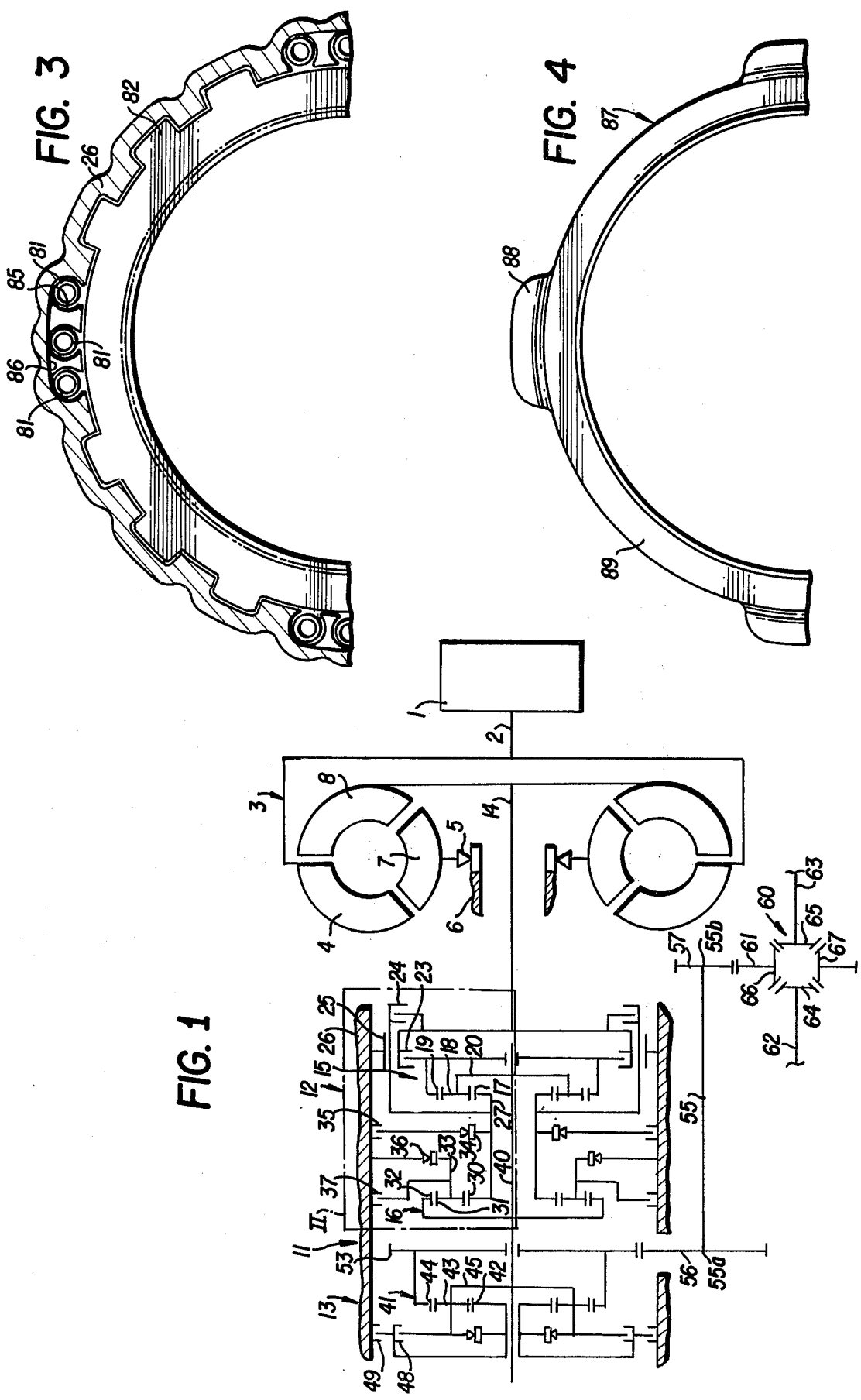
FIG. 1 is a schematic diagram, showing the construction of a particular automatic transmission in which the present construction for releasing engagement of a brake is incorporated, and also showing in schematic form an engine, a torque converter, and a differential mechanism coupled to this automatic transmission.

The present invention will now be described with respect to a particular embodiment thereof, and with reference to the accompanying drawings, in which like reference numerals denote like parts in the several figures thereof.

In FIG. 1 there is schematically shown an automatic transmission for a front engine front wheel drive automobile, which incorporates a construction for releasing engagement which is a preferred embodiment of the present invention. In this figure, the reference numeral 1 denotes an internal combustion engine of the automobile, whose power output shaft 2 provides rotational power to a hydraulic torque converter 3. The hydraulic torque converter 3 is of a per se well known kind, and comprises a pump impeller 4 rotationally coupled to the power output shaft 2 of the engine 1, a stator 7 which is supported via a one way clutch 5 by the torque converter housing 6 (which is fixed), and a turbine member 8 which is supported on and rotationally coupled to a shaft 14, which acts as a power output shaft of the torque converter 3. The shaft 14 is also the input shaft of an automatic transmission 11, which comprises a number of gear wheels which provide various different transmission speeds, and which are automatically engaged and disengaged under the control of a fluid pressure control system which is not shown.

The automatic transmission 11 comprises an underdrive mechanism 12 and an overdrive mechanism 13. These mechanisms comprise planetary gear systems, and the engagement and disengagement of various elements of these planetary gear systems is performed by hydraulically operated friction devices, i.e. clutches and brakes, which will be described in detail hereinafter. One of these friction engagement devices incorporates a first embodiment of the construction according to the present invention; the others are conventional.

In more detail, the underdrive mechanism 12 comprises a first planetary gear mechanism 15 and a second planetary gear mechanism 16. The first planetary gear mechanism 15 comprises a sun gear 17, a plurality of planetary pinions 18, and a ring gear 19 rotatably supported by a carrier 20. The planetary pinions 18 are meshed in a per se conventional fashion between the sun gear 17 and the ring gear 19. A first clutch 23 selectively connects the power input shaft 14 of the automatic transmission to the ring gear 19. A second clutch 24 selectively connects the power input shaft 14 to an axle 27 which extends to the left in the drawing from the sun gear 17. Further, a brake 25 is arranged so as selectively to connect this axle 27 which extends from the sun gear 17 to the housing 26 of the transmission, i.e. so as to stop the rotation of the sun gear 17.

The second planetary gear mechanism 16 comprises a sun gear 30, a plurality of planetary pinions 31 rotatably supported on a carrier 33, and a ring gear 32. The planetary pinions 31 are meshed between the sun gear 30 and the ring gear 32 in a per se conventional fashion. The sun gear 30 is connected to the left hand end in the drawing of said shaft 27 which extends from the first sun gear 17. Further, between this shaft 27 and the transmission housing 26 there are provided, in series, a one way clutch 34 and a brake 35. Further, between the carrier 33 and the transmission housing 26, there are provided in parallel a one way clutch 36 and a brake 37. The carrier 20 incorporated in the first planetary gear mechanism 15 and the ring gear 32 incorporated in the second planetary gear mechanism 16 are rotationally coupled together by and are supported by an intermediate shaft 40, which is coaxial with the power input shaft 14. Further, this intermediate shaft 40 extends to the left in the drawing out of the underdrive mechanism 12, and serves as a power input shaft for the overdrive mechanism 13.

The overdrive mechanism 13 comprises a planetary gear mechanism 41, which comprises a sun gear 42, a ring gear 44, and a plurality of planetary pinions 43 rotatably supported on a carrier 45. Again, the planetary pinions 43 are meshed between the sun gear 45 and the ring gear 44 in a per se well known fashion. The intermediate shaft 40 is rotationally connected to the carrier 45. A clutch 48 is provided between the carrier 45 and the sun gear 42, so as selectively to rotationally couple these two elements. Further, a brake 49 is provided between the sun gear 42 and the transmission casing 26, i.e. so as selectively to stop the rotation of the sun gear 42. A one way clutch 54 is provided between the carrier 45 and the sun gear 42. Further, to the ring gear 44 there is connected a power output gear wheel 53, from which power output is taken from the automatic transmission 11.

Parallel to the central axis of the transmission 11, and below it in FIG. 1, there is provided a counter shaft 55, on the left hand end 55a of which there is mounted a gear wheel 56 which is meshed with the aforesaid power output gear wheel 53. At the other end 55b of the counter shaft 55 there is mounted a gear wheel 57, which is meshed with an input gear wheel 61 of a differential gear mechanism 60, which is of a per se well known type, and which comprises two pairs of bevel gears 64, 65 and 66, 67. The bevel gears 66 and 67 are mounted coaxially on a shaft which is mounted on a frame fixed to the input gear 61, parallel thereto and passing through the rotational axis of the gear 61, and the pair of bevel gears 64 and 65 are respectively connected to front axle shafts 62 and 63, the other ends of which transmit power to the front wheels of the automobile, which are not shown.

In the Table, the operational conditions of the clutches, the one way clutches, and the brakes of the transmission 11 are shown, in the various speed stages provided thereby.

In the following Table, "E" indicates that the corresponding element (a clutch, a one way clutch, or a brake) is engaged; "(E)" indicates that a one way clutch is engaged only when the engine is providing rotational power to propel the automobile along the road, and is disengaged during the engine braking or overrun condition; and furthermore "e" indicates that, similarly, a one way clutch is engaged when the engine is providing rotational power to propel the automobile along the road, but that in this particular operational condition, since the transmission of this power is ensured by a friction element such as a clutch or brake which is included in parallel with the one way clutch, the function provided by the one way clutch is not actually necessary.

To a person of ordinary skill in the art, upon consideration of the Table, and of FIG. 1, the operation of the transmission shown in FIG. 1 in its various speed stages will be clear without any further explanation, which is accordingly omitted for reasons of economy of description.

TABLE

| clutch/brake | | 23 | 24 | 25 | 35 | 37 | 34 | 36 | 48 | 49 | 54 |
|---|---|---|---|---|---|---|---|---|---|---|---|
| FORWARD | | | | | | | | | | | |
| D | 1st | E | | | | | | (E) | | | (E) |
| range | 2nd | E | E | | E | E | | | E | | (E) |
| | 3rd | E | E | | | | | | E | | e |
| | 4th (O/D) | E | E | | | | | | | E | |
| 2 | 1st | E | | | | E | E | | | | (E) |
| range | 2nd | E | | E | | | | | E | | e |
| L | 1st | E | | | | E | | e | E | | e |
| Reverse (R) range | | | E | | | E | | | | E | |

Figure 2:
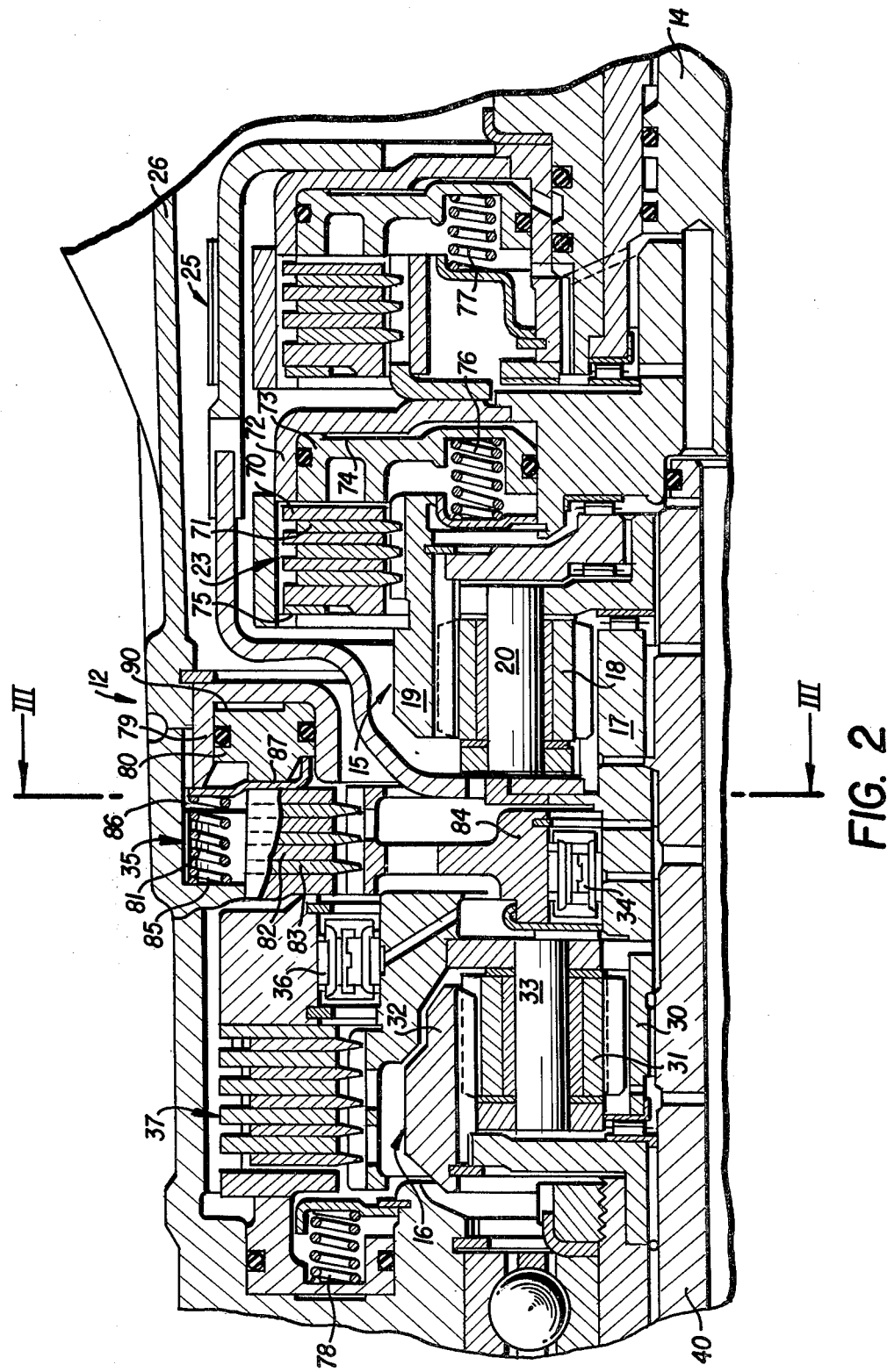
FIG. 2 is a longitudinal sectional view of part of the automatic transmission which is schematically shown in FIG. 1, and which is surrounded by the dot/dashed line II in FIG. 1, particularly showing the layout and construction of a brake which incorporates a first preferred embodiment of the construction for releasing engagement according to the present invention.

In FIG. 2, the detailed physical construction of part of the automatic transmission 11 shown in a schematic form in FIG. 1 is more clearly shown. This part is surrounded by a single-dotted line in FIG. 1, and is denoted therein by II.

In this automatic transmission, as may be seen in FIG. 2, the clutches 23 and 24, and also the brake 37, are constructed according to well known and conventional constructions for clutches and brakes in this type of automatic transmission. For example, in the clutch 23 there are provided a set of first friction plate elements 70 which are interleaved with a set of second friction plate elements 71 in axially overlapped relation. The first friction plate elements 70 are rotationally connected to the power input shaft 14, and rotate together with the power input shaft 14. The set of second friction plate elements 71 are rotationally connected to the ring gear 19 of the first planetary gear mechanism 15, and rotate together with it. A hydraulic piston device is provided for selectively squeezing these sandwiched friction plate elements 70 and 71 together so as to engage them. This hydraulic piston device comprises an annular piston 73 which reciprocates axially to and fro within an annular space, the outer periphery of which is defined by a side wall element 72, and the inner periphery of which is defined by part of the power input shaft 14. An annular pressure chamber 74 is defined to the right in FIG. 2 of the annular piston 73, and, when hydraulic fluid pressure is supplied to this annular pressure chamber 74, the annular piston 73 is driven leftwards in FIG. 2 so as to press together the sandwiched assembly of the first and second friction plate elements 70 and 71 between the piston 73 and a backing snap ring 75.

The arrangements for returning this conventional hydraulic piston assembly from the engaged to the disengaged condition are as follows. In the radially inner part of the piston 73 there is formed a hollow, facing along the axis of the piston 73 to the left in the drawing, and one end of a compression coil spring 76 is seated within this hollow, while the other end of the compression coil spring 76 bears against a stop member which is coupled to the radially inner wall of the pressure chamber 74, which, as mentioned above, is constituted by part of the power input shaft 14. In fact, of course, a plurality of such hollows are formed in the piston member 73, and a plurality of such compression coil springs 76 are disposed all around the central axis of the transmission, but only one of them is visible in FIG. 2. By the action of the compression coil spring 76, the annular piston member 73 is biased in the rightwards direction in the drawing, so as to reduce the size of the annular pressure chamber 74, and so as to release the engagement together of the first and second friction plate elements 70 and 71.

The clutch 24 and the brake 37 are of essentially similar construction to the clutch 23, and again in their case the radially inner parts of the pistons are formed with hollow facing along their rotational axes, in which hollows are seated compression coil springs, denoted by the reference numeral 77 in the case of the clutch 74, and by the reference numeral 78 in the case of the brake 37, which serve to bias the piston members of these friction engagement devices in the respective directions to reduce the size of their respective actuating annular pressure chambers.

According to such conventional constructions, a considerable amount of space is required radially inward of the friction plate elements of each of these friction engaging devices. This space is therefore not available for other components of the automatic transmission, such as gears, and accordingly such gears will be required to be located as axially separated from the return springs of the friction engagement devices, accordingly increasing the total axial length of the transmission. This is most undesirable, as explained above.

However, the brake 35 is constructed according to a construction which is a preferred embodiment of the present invention, and which allows much more effective use of the limited axial space available within the transmission. In fact, as will be seen by examining FIG. 2, the brake 35 is partly overlapped in the axial direction with the first planetary gear mechanism 15, because the sun gear 17, the planetary pinions 18, and the ring gear 19 of the first planetary mechanism 15 protrude leftwards within the central hole of the annular piston 80 and the side walls of the annular fluid pressure chamber 90 of this brake 35, which will be explained in detail hereinafter. Accordingly, much more efficient use of the limited axial space within the transmission is made. However, according to this overlap, space available in the radial dimension for the hydraulic piston system comprising the annular piston 80 and the annular fluid pressure chamber 90 is, by comparison with the other conventional clutches 23, 24 and with the brake 37, extremely limited. Therefore, novel arrangements are made in the brake 35 for accommodating the return springs, such as compression coil springs 81, which urge the piston 80 towards its restored position to the right in FIG. 2.

In more detail, the brake 35 comprises a set of first friction plate elements 82 and a set of second friction plate elements 83, which again are mutually interleaved and are axially sandwiched over and opposed to one another. Each of the set of first friction plate elements 82 is rotationally coupled or splined to a cylindrically arcuate inner wall portion of the housing 26 of the transmission 12 by tags which are engaged into corresponding axial spline grooves formed in the cylindrically arcuate inner wall portion of the housing 26, as may be seen in FIG. 3, which is a partial section through FIG. 2 along the lines III—III; and each of the set of second friction plate elements 83 is rotationally connected by splines or tags to a disk member 84 which is mounted on the outside part of the one way clutch 34, the inside part of which is mounted to the intermediate shaft 40. The annular piston 80 reciprocates to the left and right in FIG. 2 within an annular space partly defined by an annular wall member 79, and to the right of the piston 80 in FIG. 2 there is defined a fluid pressure chamber 90, to which fluid pressure is selectively supplied, according to the speed stage of the transmission, as shown in the Table, by arrangements not shown in the figures, and not described herein because they are per se conventional and well known. The left hand side of the piston 80 in FIG. 2 bears against the right hand face of a pressure member 87, the left hand face of which bears against the sandwiched and overlapped first and second friction plate elements 82 and 83.

As may be best seen in FIG. 4, which is a partial illustration of the pressure member 87, this pressure member 87 is formed with an annular portion 89 and a plurality of ear or tag portions 88 protruding therefrom at intervals around its outer circumference. The annular portion 89 is for interposition between the piston member 80 and the overlapped friction plate elements 82 and 83, as already described, but on the other hand the projecting ear portions 88 project radially outwards from the pressure member 87, and each projects into a cut away hole 86 formed within the housing 26 of the transmission 12. In more detail, around the circumference of the housing 26 at an axial location as shown by the plane of the section III—III in FIG. 2, there are axially bored at intervals around the circumference of the transmission housing 26 four sets of three adjacent bores 85, in this embodiment, and the three cylindrical bores 85 in each of these sets all open to one of the cut away holes 86. For ease of construction of the transmission housing 26, in fact, as may be seen from FIG. 2, this transmission housing 26 is formed as two separate castings which are abutted together at an axial location somewhat to the right in FIG. 2 of the line of the section III—III.

In each of the cylindrical holes 85 there is fitted a compression coil spring 81, and, as may be understood from FIG. 3, there are provided twelve compression coil springs 81 in all, which are arranged in four groups of three, arranged at 90° intervals around the circumference of the transmission housing 26. Closed left hand ends in FIG. 2 of the cylindrical holes 85 support the left hand ends of the compression coil springs 81, and the right hand ends of the compression coil springs 81 project out of the respective cylindrical holes 85 into the common cutaway hole 86 and there they bear against the projecting ear tag portions 88 of the pressure plate element 87. Accordingly, the pressure plate 87 is biased to the right in FIG. 2, so as to decrease the size of the annular pressure chamber 90.

The brake 35 described above operates as follows. When it is desired to engage the brake 35 so as to couple (in one rotational sense, due to the provision of the one way clutch 34), the intermediate shaft 27 to the transmission housing 26, hydraulic fluid pressure is supplied to the annular fluid pressure chamber 90 by a control means which is not shown, and accordingly the annular piston 80 is biased to the left in FIG. 2, against the pressure plate element 87. Each of ear tag portions 88 of the pressure plate element 87, moving to the left in FIG. 2, compresses three of the compression coil springs 81 during this motion, and the left hand side of the pressure plate element 87 squeezes together, as an interleaved sandwich, the sets of first and second friction plate elements 82 and 83, so as positively to engage them together and so as to prevent relative rotation between these friction plate elements, and so as thereby rotationally to engage the intermediate shaft 27 to the transmission housing 26. When, on the other hand, the hydraulic fluid pressure within the annular pressure chamber 90 is released, i.e. vented, then the pressure plate element 87 is driven to the right in FIG. 2 by the force of the compression coil springs 81 acting on the projecting ear tag portions 88, and accordingly the annular piston 80 is driven to the right in FIG. 2 so as to reduce the size of the annular fluid pressure chamber 90. This releases the compression force exerted on the sandwiched sets of first and second friction plate elements 82 and 83, and allows them to slip with respect to one another, thus disengaging the intermediate shaft 27 from the transmission housing 26.

It will be seen and understood from the above description that, with a brake of the illustrated construction, like the brake 35, even although it may not be possible to incorporate a return spring for an annular piston in any radially inwardly located hollow on the piston itself, because of restriction of the total radial dimension available for the hydraulic fluid pressure device incorporating the piston, by disposing such a return spring in a position radially external to the piston device, and radially external to the friction plate elements which are to be squeezed together by the piston device, it is possible to provide good biasing of the annular piston, without employing any space towards its radially inward portion. Accordingly, the inner hole available through the central portion of this annular piston may be used for accommodation of other elements of the transmission, such as planetary gears or the like, as is the case in the shown embodiment. Therefore, this results in a very useful possibility for reduction of the total axial dimension of a transmission.

A subsidiary advantage of the construction according to the present invention, in which the return spring is located in a hole in the housing, is that thereby the return spring is much less likely to suffer damage due to overheating or the like. Thus, its durability is much improved. This is because the metal of the housing, which is a good heat sink, is in intimate contact with the sides of the spring. This means that the possibility of the brake failing due to weakening of the spring thereof is made much less likely.

Of course, the construction for the brake 35 according to the preferred embodiment of the present invention, shown as an example in the transmission illustrated in FIGS. 1 and 2, might also be applied to the brake 49, which is not shown with regard to its constructional details in FIG. 2. If such a construction is adopted, a further reduction of the total axial dimension of the transmission will be obtained. On the other hand, it will be readily appreciated that the construction according to the present invention is not suitable for constructing a clutch, but is only suitable for constructing a brake, because the return springs, which as a practical matter must be rotationally stationary with regard to the friction plate elements, when they are compressed together, are located within cavities formed in the housing of the transmission.

However, in other embodiments, variations could be made to the structure of the braking device. For example, it is not strictly required that the piston, or the pressure chamber, should be completely annular. Further, the provision of a pressure plate member such as the pressure plate member 87 is not strictly necessary for the practice of the present invention, although it is preferable, because it distributes well the force due to the piston, over the friction engaging elements. The springs could be other types of spring than compression coil springs. Accordingly, although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

What is claimed is:

1. A transmission comprising:

a housing having a cylindrically arcuate inner wall portion formed with a plurality of axial spline grooves, a plurality of axial cylindrical holes arranged side by side with said axial spline grooves at substantially the same axial portion of said housing and each being closed at one end thereof, and a plurality of cutaway holes axially connected with the other ends of said axial cylindrical holes;

a gear transmission mechanism received within said housing;

a plurality of first annular friction plate elements mounted substantially parallel to and overlapping one another so as to be rotatable about an axis, and connected to part of said gear transmission mechanism, and a plurality of second annular friction plate elements mounted substantially parallel to and overlapping one another and interleaved and axially opposed to said first annular friction plate elements and having a plurality of first radially outwardly projecting tag portions engaged into said plurality of axial spline grooves so as to be rotationally coupled to said housing, selective mutual engagement and disengagement of said first and second annular friction plate elements selectively providing different speed stages of said transmission;

a fluid pressure chamber and a piston fitted in said fluid pressure chamber; supply of fluid pressure to said fluid pressure chamber impelling said piston so as to squeeze said first and second annular friction plate elements together in the direction along said axis and so as to cause said engagement;

an annular pressure member located between said piston and said first and second annular friction plate elements and transmitting force from said piston to engage said first and second annular friction plate elements together, said annular pressure member having a plurality of radially outwardly projecting tag portions each being engaged into one of said cutaway holes; and a plurality of compression coil springs each being mounted in one of said axial cylindrical holes with one end thereof abutting said closed end of said axial cylindrical holes and with the other end thereof abutting said tag portion of said annular pressure member, arranged radially external with respect to said axis from said first and second annular friction plate elements, said springs biasing said piston by way of said annular pressure element in the direction to reduce the size of said fluid pressure chamber.

2. A transmission according to claim 1, wherein more than one said axial cylindrical holes are connected with one said cutaway hole common thereto, and abut one said tag portion of said annular pressure chamber.

* * * * *